United States Patent

[11] 3,555,246

[72] Inventor Jerome H. Lemelson
 85 Rector St., Metuchen, N.J. 08840
[21] Appl. No. 622,650
[22] Filed Mar. 13, 1967
 Continuation-in-part of Ser. No.
 337,615, Jan. 14, 1964, now Patent No.
 3,309,669.
[45] Patented Jan. 12, 1971

[54] DOCUMENT READING APPARATUS
 10 Claims, 6 Drawing Figs.
[52] U.S. Cl. .................................................. 235/61.11,
 250/219
[51] Int. Cl. .................................................. G06k 7/10
[50] Field of Search ..................................... 235/61.115,
 61.11, 61.112; 340/174.1C, 146.3(Cursory);
 250/219ID, IDC

[56] References Cited
UNITED STATES PATENTS
2,261,542 11/1941 Dickinson et al. ............ 235/61.115C
2,986,725 5/1961 Dirks ........................... 340/174.1C
3,229,073 1/1966 Macker et al. ................ 235/61.115
3,238,501 3/1966 Mak et al. .................... 235/61.11

*Primary Examiner*—Thomas A. Robinson

ABSTRACT: A document reading device for reading a selected line of characters or coded information provided on a document such as a card or sheet of paper. Documents are individually fed to the upper surface of a platform and are driven in a first direction therealong by controlled roller means until a selected line of characters becomes aligned with a scanner which is operative thereafter to scan lateral to said first direction. The means for controlling the driving means includes a detection means for detecting the leading edge of the document or a mark which is predeterminately printed on the document with respect to the line of the document to be scanned and read. The apparatus includes adjustable means for the detecting means or delay means for the output signal thereof which is adjustable in time so as to provide means for stopping the document at different locations along the upper surface of said platform so as to bring a selected lateral line of characters into alignment with the reading scanner. The detecting means may also be operative to scan marks or edge notches in the document aligned with each line of characters or recording area therefore so as to permit the immediate reading of any selected line of the document. In addition to providing means for predeterminately stopping and locating documents with respect to a scanning device for reading selected recording areas of a document, the detecting means is also operative to directly or indirectly control scanning of said selected recording area.

INVENTOR.
Jerome H. Lemelson

INVENTOR.
Jerome H. Lemelson

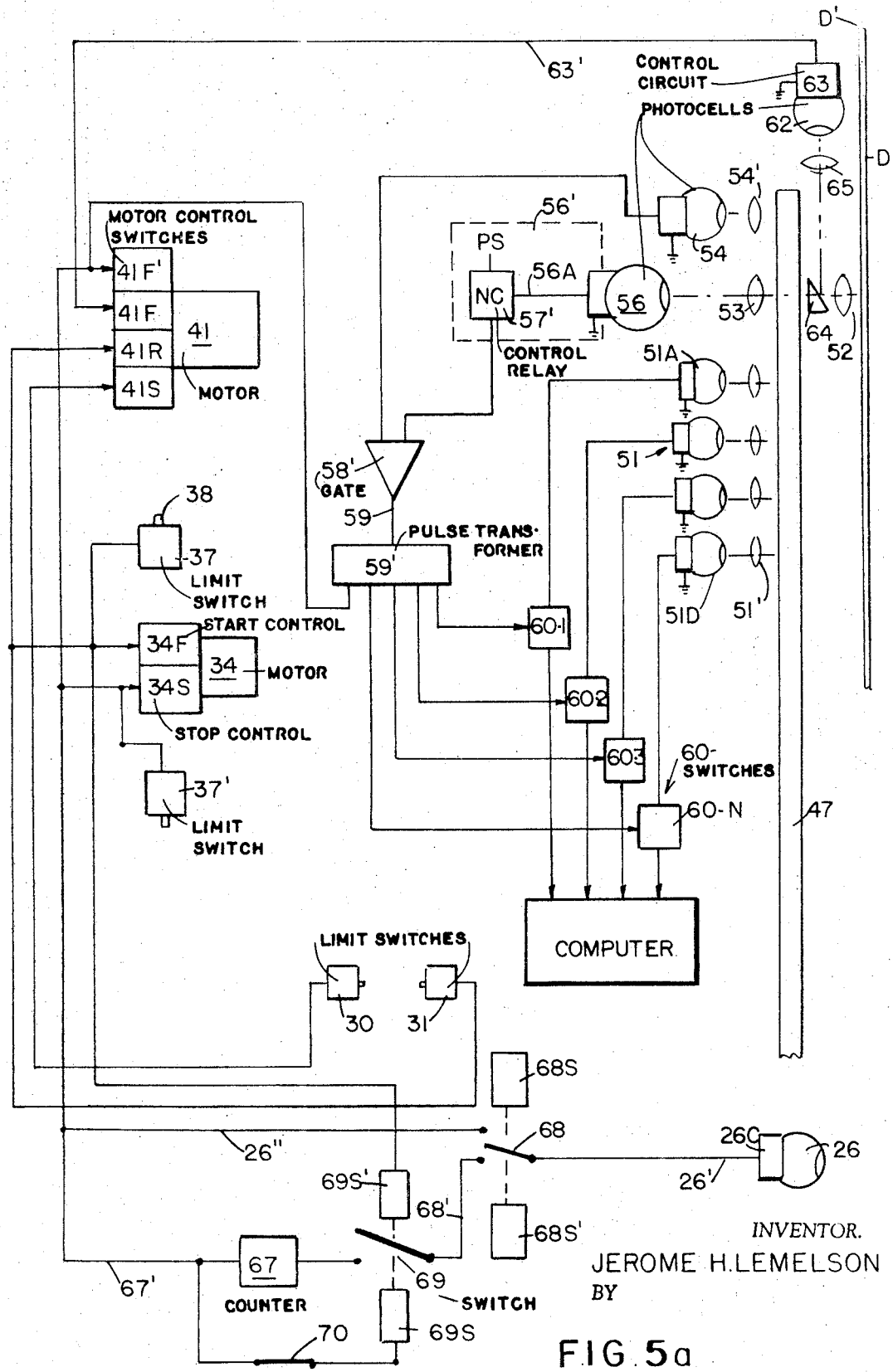

DOCUMENT READING APPARATUS

CROSS-REFERENCE TO RELATED APPLICATIONS

This is a continuation-in-part of copending application Ser. No. 337,615 filed Jan. 14, 1964 for Scanning Apparatus for Reading Documents Comprising a Rotating Scanning Disc, now U.S. Pat. No. 3,309,669.

SUMMARY OF THE INVENTION

The instant invention relates to document reading devices and more particularly to electronic character scanning devices applicable to scanning alpha-numeric characters in a sequential fashion on a line by line basis.

Numerous business and industrial applications require the recording of data in the form of alpha-numeric characters for the purpose of documenting business transactions; meter and instrument readings; inventory accountings, to name just a few. All such data is normally read into a computer or data processing facility for permanent storage, computing or other processing facilities.

Data of this type is normally inserted into the computer or data processing facility by a manual operation such as by punching the data into an IBM type punch card in binary form; generating holes by punching the data into a punched paper tape; or converting data to code by means of a typewriter specially wired as an input device to the computer. All of these operations require visual observation by the operator and manual actuation of the keyboard of the card tape punch or typewriter, all of which are slow and require tedious operations susceptible to the introduction of human error.

The instant invention is adapted to scan alpha-numeric characters printed on a sheet of paper or card, in a sequential fashion and automatically convert the alpha-numeric data into binary form which may be immediately and directly inserted into the computer or data processing facility.

The instant invention is comprised of a platform adapted to receive cards upon which alpha-numeric information is printed. When properly positioned upon the platform, the card actuates a sensing relay such as a microswitch means which is operative to activate a scanning means to scan across a selected line of alpha-numeric data. After each line is scanned a sensing means actuates a feed means which steps the card carrying the data to the next line to be read. This operation is repeated until all of the data on the card is scanned.

The scanning means is comprised of a light source impinging upon the data carrying card. The light is reflected from the card surface and is focused upon a rotating multiapertured disc means having a plurality of apertures equal in number to the total possible number of alpha-numeric characters to be scanned (say 36 or 26 alphabetic and 10 numeric characters). The light focused upon the rotating disc means is further focused upon light sensing means after passing through the disc apertures. Each aperture has a configuration equivalent to an associated alpha-numeric character.

Radially aligned and associated with the character shaped apertures are radial or circular code apertures, each arranged in such a manner as to define binary representations of the alpha-numeric character with which it is associated. When a minimum signal is detected by the first light sensing means this activates a plurality of second light sensing means upon which impinges the light passing through the radial or circular apertures. The energized light sensing means generate signals representative of one binary condition representing the character scanned. These signals are impressed in parallel fashion into separate stages of a multistage electronic register. The binary coded character may then be stepped into the computer internal memory in either parallel or serial fashion. The multiapertured rotating disc rotates one complete revolution so each character in a line is scanned to appropriately scan and convert each alpha-numeric character into binary coded signals. Upon completion of reading the last line of data to be scanned the scanning means is automatically reset to begin scanning the next card inserted. After positioning the card upon the platform, the entire operation is automatic and is performed at speeds not realized by manual data conversion means.

Whereas electro-optical reading apparatus of the prior art operated by scanning each character along a plurality of coordinates or scanning lines to generate a plurality of signals each derived when a portion or level of the character is scanned, and which signals are analyzed by comparison means to determine the identity of the character being scanned, the apparatus herein provided scans to determine when minimum light passes through a rotating mask containing apertures the shape of the characters scanned. The occurrence of the condition in which minimum light passes to the photoelectric relay is indicative that the character being scanned corresponds substantially to the shape of the opening in the mask. Upon attaining such condition, the scanning or reading relay is energized to effect the reading of the binary code on the disc associated with the opening in the mask having the shape of the character being read.

It is therefore a primary object of the instant invention to provide a new and improved data conversion means for scanning alpha-numeric characters and automatically converting characters so scanned into binary code groups readily presentable to computers, data processing facilities and the like.

Another object is to provide an electro-optical line character reading apparatus which has a minimum number of components and is therefore substantially simpler and lower in cost to produce than conventional electro-optical readers.

Another object of the instant invention is to provide scanning means for use in computers, data processors and the like comprising means for sequentially scanning lines of data line-by-line and automatically converting characters so scanned into binary coded representations thereof.

Another object of the instant invention is to provide means for scanning alpha-numeric data comprising means for receiving data carrying card means, automatically stepping said card line-by-line after completion of sequential scanning of each line.

Another object of the instant invention is to provide means for converting alpha-numerically presented data into binary coded representations thereof comprising rotatable scanning means having a plurality of alpha-numeric shaped apertures and associated circular apertures radially aligned for scanning the characters in a card and converting the characters so scanned into binary coded representations thereof.

These and other objects of the instant invention will become apparent when reading the accompanying description and drawings in which:

FIG. 5a is a schematic diagram showing further aspects of control of the scanner.

FIG. 1 is an isometric view of an electromechanical scanning device 20 employing the principles of the invention. The scanning apparatus comprises a base 21 which supports means for aligning and driving a document to be read into a reading position, means for scanning the document and means for removing the document once scanned.

Figure 1:
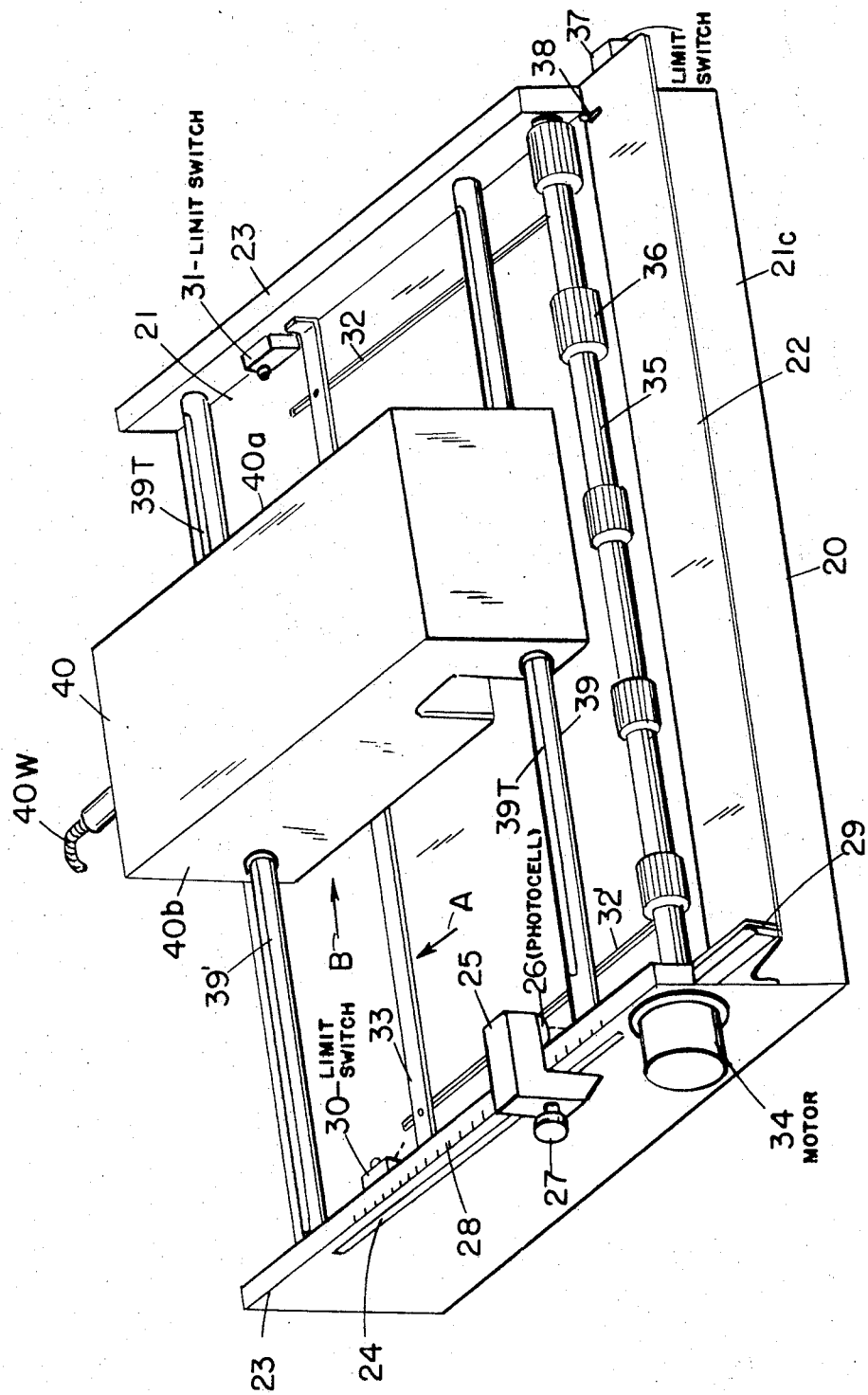
FIG. 1 is a perspective view of a scanning device designed in accordance with the principles of the instant invention.

The base 21 supports a platform 22 designed to receive the document from a conveyor, chute or other transfer means (not shown). The platform 22 projects from one end of the base and is supported on brackets 29 by the front wall 21c of 21. The platform 22 also supports a limit switch 37 having an actuator arm 38 positioned to be deflected by a document fed to the platform and operative to start a servo for driving the document through the device. Notations 23 and 23' refer to parallel projecting portions of the sidewalls of the base 21 which serve to support various components including two rodlike elements 39 and 39' which define tracks for a housing 40, a shaft 35 operative to drive documents into reading position and a scanning device 25 to be described. The shaft 35 is supported for rotation by suitable bearings secured by the sidewalls 22 and 23. A plurality of cylindrical rollers 36 are secured to shaft 35 and are adapted to engage the upper surface of a document, fed thereto, against the upper surface of base 21 and to drive said document along 21 into reading position when gear motor 34 to which shaft 35 is coupled, operates.

The document scanning device which includes a rotating disc and an electro-optical scanning system, is provided within housing 40 which is self propelled and movable laterally across the base 21 in a path defined by tract members 39 and 39', is operative to scan in a fixed path or band area which is parallel to the track members 39 and 39'. Therefore, the position of the document on the surface of 21 or the degree it has been driven in the direction A until stopped for scanning, will determine that portion or line of the document to be scanned. Positioning the document for scanning is effected, in one mode of operation, by the means of a photoelectric cell 26 provided on a mount 25 which is adapted to be adjustably located along the edge of the wall 23 so as to vary the location of the scanning axis of cell 26. The photoelectric detector 26 is operative to scan and detect either the leading edge of the document or a mark or other means indicative of the position of the last entry on the card or line to be read and provides a signal upon sensing said marks, which signal is operative to stop motor 34 and start the motor driving the housing 40 to effect the initiation of scanning the selected lateral row of characters or line of the document. Adjustment of the position of mount 25 is effected by means of a locking arrangement including a knurled head screw 27 cooperating with a nut, not shown, which is carried in a slotted hole 24 in wall 23, the combination being operative to lock base 25 in a selected of a plurality of positions along 23 which positions are indicated by marks 28 on the upper surface of 23. The marks 28 are so calibrated as to indicate where to position mount 25 for effecting the stoppage of motor 34 to preposition the document for scanning respective lateral band areas or selected line entries of the document.

The reader housing 40 is movable along tracks 39 and 39' between limits defined by the sidewalls 22 and 23 and movement of the housing in one direction is operative to effect the completion of scanning of one line of characters extending across the document. The housing 40 is driven by a motor 41 illustrated in FIG. 2 as being mounted within and supported by the walls of the housing 40 and having a drive shaft 42 supporting a toothed drive wheel 43 which engages teeth formed in a channel 39C provided longitudinally along track member 39. While the operation of gear motor 41 is initiated as a result of the signal generated by the scanner 26, the motor 41 is reversed to return 40 to its starting position when the actuator of a limit switch 31 positioned on wall 22 to engage the sidewall 40a of 40, is activated. The switch 31 is operatively connected to the necessary reversing control for motor 41 which is located within housing 40 through a flexible cable 40W secured to said housing and sufficiently slack to move therewith. A second limit switch 30 supported by wall 23, is operative to stop motor 41 when the housing returns to the homing position adjacent wall 23. The actuator of 30 is activated when the housing sidewall 40b moves thereagainst.

Figure 2:
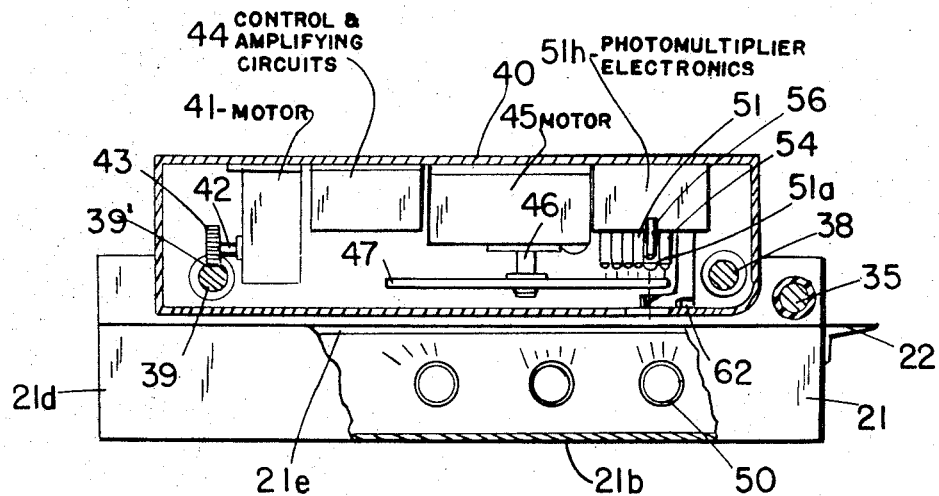
FIG. 2 is a side view of the scanning device of FIG. 1 with portions of the scanning means housing removed to expose the interior construction.
Figure 3:
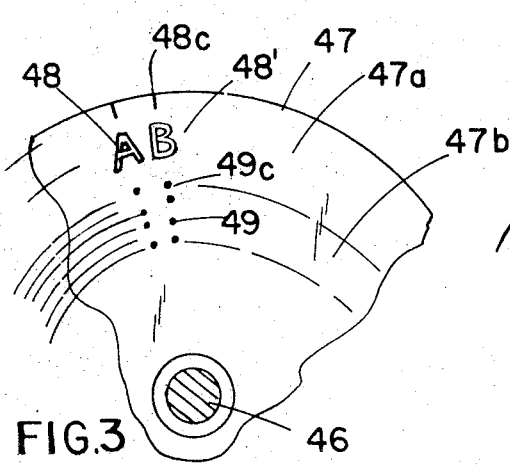
FIGS. 3 and 4 are plan views showing portions of the scanning disc means of FIG. 2 to aid in the description of the instant invention.

Further details of the scanner 20 are illustrated in FIGS. 2 to 5 and include a subhousing 44 mounted within housing 40, which contains various control and amplifying circuits to be described, a constant speed motor drive unit 45 for a scanning disc 47 secured to the drive shaft 46 of 45 and a bank of photomultiplier cells 51 positioned to scan a portion of the scanning disc 47. Document illuminating lamps 50 are mounted in base 21 and/or housing 40. In a preferred form of the invention, although not necessarily the only scanning means applicable to the apparatus hereinabove described, character scanning is effected by the provision of areas or windows 48 around the disc, which areas are shaped to the contours of the characters being read and are light transmitting while adjacent areas 48' are opaque and mask light directed against the particular annular band area 47A of disc 47 containing the characters 48 so defined. Disposed radially inward of each character 48 is an array of spot areas in the form of respective codes 49 which are scannable by the bank of photomultiplier devices 51 some of which have been omitted from FIG. 5 for purposes of simplicity. Thus each character window 48 is identifiable by a particular code 49 which code, when the corresponding window 48 matches the character being read, is generated to provide a parallel code on a circuit which code is indicative of the character so identified. Also shown in FIG. 2 are a plurality of lamps 50 secured within base 21 for directly passing light through the document being read to provide images of the characters thereof in the electro-optical scanning system, although reflex lighting means mounted within housing 40 may be employed to illuminate the upper surface of the document.

Figure 4:
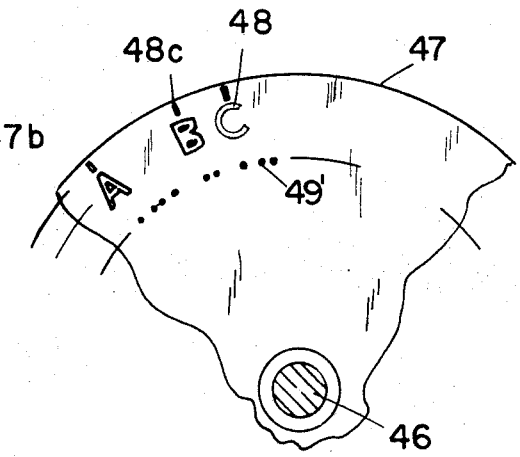

In FIG. 4, a code 49' associated with each disc character window 48 is provided along a particular circular path of the disc having as its center the axis of rotation of said disc. In this embodiment, only one scanning cell need be employed and the code generated is in series rather than the parallel form provided in FIG. 3.

Notation 48C refers to scannable marks or light transmitting lines, there being one such line provided radially aligned with each disc character 48 for locating said character and the code associated therewith to perform the function described hereafter.

Figure 5:
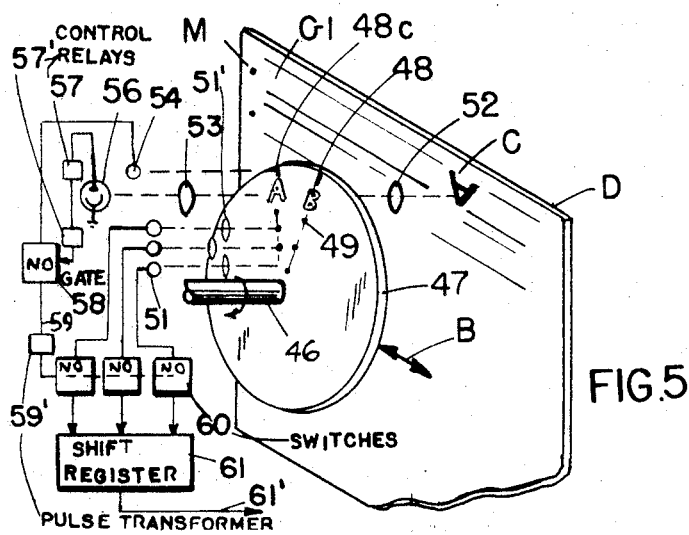
FIG. 5 is a partial perspective and partial block diagram showing the scanning means of FIGS. 1 through 4 in greater detail.

The basic mode of operation of the electro-optical scanning system is illustrated in FIG. 5 which shows a document D being scanned, disc 47 which rotates at constant speed and preferably in the range of several thousand revolutions per minute or more and a plurality of elements 51 to 56 comprising the electro-optical systems and elements 57 to 60 comprising a portion of the signal generating and gating system.

The method of scanning and detecting particular alpha-numeric characters of the printed line being scanned, illustrated in FIG. 5, is based on the principle that, if the line to be scanned is substantially aligned with the optical system of the scanner, represented by lenses 52 and 53, the shapes of light transmitting windows 48 are substantially similar in contour and size as the images of respective scanned characters projected on the surface of band area 47A of the disc 47 is traversed along a path such as indicated by arrow B parallel to the line of characters being read, and said disc is rotated at a high enough speed, then at least once during each complete rotation of the disc a condition will exist where minimum or zero light will pass to a reading photoelectric cell 56 adapted to receive only that light passed through the disc character windows 48. When such a condition of minimum light passage to the cell 56 exists, a relay or control circuit 57 which is operatively connected to the output of the photoelectric device 56 is operative to generate a signal on its output when a minimum current or no current appears on its input from 56, and said signal generated thereby is passed to the switching input of a normally open electronic gate 58 having an input from photoelectric scanner 54 which is operative to scan the light transmitting disc-character location marks or apertures 48C. Thus when signals are simultaneously generated on the outputs of scanners 54 and control circuit 57, the output 59 of normally open gate 58 is energized by the signal passed to its input from photocell 54 receiving light passed through character marker aperture 48C, which signal is utilized to gate the code signals generated as ready by the bank of photomultiplier devices 51. Each photomultiplier tube or device 51 is connected to a respective normally open monostable electronic gate of a bank 60 of such gates denoted 60-1, 60-2.... 60-N, the switching inputs of each of which are connected to a respective output of a pulse transformer 59' having line 59 as its input. The multiple outputs of 59' become simultaneously energized when a pulse appears in line 59 from gate 58 and all of the normally open switches 60' simultaneously close for a duration to pass the signals generated by those photomultiplier devices 51a which are energized in scanning marks or light passed through holes 49 in the opaque disc 47. In other words, the code 49C which is radially aligned with the particular character being scanned by the photomultiplier bank 51, is passed through the temporarily opened switches of bank 60 and is either recorded as a parallel binary bit code by connection of the outputs of said switches to respective recording transducers or is passed to a shift register 61 for converting said code to a series code prior to recording or otherwise utilizing it.

In other words, the code 49C which is radially aligned with the particular character being scanned by the photomultiplier bank 51, is passed through the temporarily closed switches of bank 60 and is either recorded as a parallel binary bit code by connection of the outputs of said switches to respective recording transducers or is passed to a shift register 61 for converting said code to a series code prior to recording or otherwise utilizing said code appearing on the output 61' of the shift register.

FIG. 5a illustrates an adjustable automatic control system applicable to the apparatus of FIGS. 1 to 5.

The scanning apparatus of FIG. 5a is adjustable to perform one of the following scanning cycles for reading one or more lines of characters provided on a plurality of documents or cards fed consecutively thereto, the selection of which control cycle to employ will depend on the scanning requirements of the particular group of documents fed thereto. Various scanning cycles may be classified as follows:

I. Scan just one line of alpha-numeric characters on a document. This may comprise:
 A. The only line of characters prepositioned on a card;
 B. The last line of characters entered on a document which document may comprise a bill, for example, with a new accounting entered periodically such as monthly as a row or line of characters so that the monthly entry on each document will appear on the same line as the others;
 C. One line of characters appearing at the same line locations on all documents, but not necessarily the last line of characters on the document.
II. Scan multiple lines of characters on the document. These may comprise:
 A. All lines on a multiline document;
 B. A preselected number of lines including the last line to be entered;
 C. Random numbers of consecutive lines of characters including the last line, where different documents may have a random number of entries made as he the last number of entries (i.e. no two documents need have the same number of last entries or last consecutive number of lines to be read);
 D. Any random lines of a document which may, though need not all, be consecutive or include the last line of characters entered.

In the control apparatus provided in FIG. 5a, for the purpose of simplifying the diagram, it is assumed that power supplies for the various components such as switching devices, relays counters, solenoids, motors, controls and the like are provided correctly in circuit therewith where not illustrated.

Describing now the control means of the apparatus of FIG. 5a which is applied to effect the various modes of scanning briefly mentioned above:

IA. Scanning the only line of characters entered on a document such as a card, is effected by feeding the document to platform 22 which trips arm 38 of limit switch 37 which pulses the start control 34F of motor 34 rotating shaft 35 to drive the card through the reader. Card edge scanner photocell 26 detects a notch or mark M printed along the left edge of the card aligned or prepositioned with respect to the line of characters to be read. The control 26C for the photocell 26 is adapted by conventional means to generate a pulse either when detecting the leading edge of the card or when a character line indicating mark M is aligned with the optical system of the photocell, which pulse is passed to the stop control 34S for motor 34 which stops the feed of the document or card to position it with said single line of characters aligned with the optical system of the character reading multiplier type photocell 56. Which of the two phenomenon is used to activate the cell 26 will depend on adjustments in the cell controls. For example, if the cell control 26C is operative to generate a control pulse upon detecting the the leading edge of the card, a light source mounted beneath the card is employed and masking said light by means of the card is operative to activate photoelectric controller 26C to generate a pulse or signal by conventional means. Conventional electronic means in controller 26C may also be used to generate a pulse on output 26' when a black mark along the left border of the card is aligned with the optical system for the cell 26.

With switch 68 connecting lines 26' and 26", the pulse output of 26C is passed to the start control 41F' of motor 41 causing housing 40 to be driven at a first speed from home position adjacent wall 23 in the direction of arrow B. The motor 41 may be operated at one speed during scanning or at two speeds including a first fast speed while the optical system of scanner 56 approaches the first character of the line to be scanned and/or during traversing the distance between characters and a second slower speed than the first while each character is moving through the optical field of the scanner 56. Such dual speed movement of the scanner will reduce the total time required for scanning each line and will permit slower scanning of each character without requiring a substantially long period to scan across the entire width of the document.

Dual speed control is effected by means of another photoelectric cell 62 which is fixedly mounted within housing 40 and adapted to receive a portion of the image passed through the optical system for character scanning cell 56 before said light passes through disc 47. A half-silvered prism 64 placed behind lens 52 is operative to pass light of images of the characters being scanned to both cells 56 and 62. The optical system for cell 62 is represented by lens 65 and is preferably adapted to present a thin line image area of the surface of the document, the length of which image area is approximately the height of largest character of the line being scanned and which line is preferably a portion of the leading edge or leading portion of the image field of the scanner 56. When cell 62 receives total reflected light (i.e. when there is no image of a character in its thin band field), cell control circuit 63 will not generate an output signal. However, as soon as the intensity of light passing to cell 62 drops below a predetermined level as caused by a portion of the image of a character entering said thin band scanning field of 62, control 63 is operative to generate a signal on its output 63' which is passed to the control 41F for motor 41 which is activated thereby to switch to slow operation and to drive scanner assembly 40 at a slow traversing rate which continues either until the image of the character being scanned has moved out of the image field of 62 so that no signal is generated on line 63' and motor control 41F' will become activated to revert to fast operation of drive motor 41 (assuming control 41F is a monostable switch which bypasses 41F'). In a more preferable mode of control, the output signal generated on line 59 when the character has been identified by scanner 56 is passed to motor control 41F' to revert to fast traverse.

The character scanning and identifying means of FIG. 5a is quite similar to that illustrated in FIG. 5. The output of character scanner cell or cells 56 is passed to a photoelectric control 56' which generates a signal on its output when zero or substantially little light is passed to the cell (i.e. when the cell scans the mask opaque areas or a character window 48 is substantially if not completely blocked of light by the image of a similarly shaped character focused thereon). The controller 56' is shown in greater detail in FIG. 5a and includes a normally closed monostable electronic gate 57' having an input from a power supply PS and an output extending to one input of an AND circuit 58'. The output 56a of the cell 56 is energized with a signal when cell 56 receives light through windows 48 in disc 47 reflected from the document and said signal is used to open switch 57' so that no current passes to 58' from PS. However, when a character window 48 matches the character being scanned, output 56 a is deenergized permitting switch 57' to close and passing current from power supply PS to gate 58'. When this occurs as the window character alignment mark or window line 48C is scanned by cell 54, an output is generated by the control for cell 54 which is passed to AND circuit 58' generating a signal on its output 59 which is passed to a pulse transformer 59' having plural outputs extending to monostable normally open switches 60 which are connected in the outputs of the code scanning photomultiplier devices 51. The switches 60–1 to 60–N, thus closed, pass those signals generated when respective of the cells 51 scan respective marks or light transmitting code portions of disc 47 radially aligned with the window of the identified character. An output of transformer 59' is also connected to fast traverse control 41F' for motor 41.

Upon completion of scanning the single line of characters, limit switch 31 is activated when the wall of housing 40 is driven against the actuator of the switch, whereby 31 switch generates a pulse signal which is passed to start control 34F of motor 34 driving the document completely out of the reader. The switch 31 may be slow to close and control 34F monostable such that motor 34 operates for a sufficient interval to remove the document from the scanning apparatus. However, a more preferred control means comprises use of a scanner 37' such as a limit switch or photoelectric relay operative to detect when the trailing edge of the document has passed out of the scanner to activate the stop control 34S of motor 34. This will permit manual adjustments to the control apparatus to effect the other modes of control as described.

IB. Scanning just the last line of characters on each document fed to the reader is effected as follows. A manually presettable, self-resetting counter 67 is connectable to the output 26' of the photoelectric control 26C by closing manual switches 68 and 69. The counter 67 receives pulses generated when cell 26 scans character line position indicating marks M along the longitudinal border of the document and may be preset to generate a control pulse on its output 67' upon receipt of a predetermined number of line indicating pulses. The output 67' of counter 67 extends to stop control 34S of motor 34 and start control 41F' of motor 41. The preset count at which counter 67 generates a pulse may be made such that the line scanned is the last line of all documents containing characters. The counter 67 may also be replaced by a presettable, self-recycling timer-relay adapted to generate a control signal which is passed to 34S and 41F' at a time after receiving a pulse generated when 26 detects the leading edge D' of the document such that the card comes to rest with a predetermined lateral band area or line of character aligned with the scanning field of scanner 56.

If marks M are provided adjacent locations all along the length of the document, the input from photoelectric control 26C to counter 67 may be deactivated until the next document is fed to the scanner by passing the control signal output of counter 67 to activate a solenoid 69S which opens a switch 69 between counter 67 and 26C so that 67 will remain deenergized until the next document enters the scanner whereupon the output of switch 37 energizes a second solenoid 69S' closing switch 69. Switch 70 between counter 67 and 69S may be manually opened permitting counter 67 to receive all pulses generated by 26C.

Further variations in the apparatus of FIGS. 1—5a are noted. Using substantially the same means illustrated for positioning and driving a document and for traversing a scanning character identifying means, the rotating disc 47 may be replaced by other movable character window containing means such as (a) a closed loop, flexible film strip or metal belt containing cutouts the shape of the characters to be read and driven in a closed loop path around a plurality of pulleys supported by a frame which also supports the scanning cells, (b) a drum having peripheral character windows arranged in a closed loop on its cylindrical surface, (c) a plate having a row of character windows having the shape of the characters to be read and movable with said row of windows moved parallel to and in alignment with the line of characters to be read. In the latter arrangement, the character scanning photocell moves parallel to the row of windows as the plate is oscillated many times back and forth across the line to be read.

In another modification, the character shaped windows or light transmitting windows 48 may be replaced by character identifying means in the form of a plurality of group of plural small holes or light transmitting windows, with the holes of each group adapted to indicate the identification of a character when the image thereof falling onto the disc or base containing the holes is operative to provide no reflected light passing through any of the holes in the group. Such a condition may be photoelectrically detected during an interval when, for example, a scanner such as mark scanner 54 scan a character position indicating mark 48C to generate an output signal as described and utilizable to read code marks as described.

As stated, if it is desired to scan the first line of characters on a document or the only line provided thereon, bistable manual switch 68 is thrown to connect circuits 26' and 26". Notations 68S and 68S' refer to solenoids which are each remotely operative for respectively throwing bistable switch 68 to either its condition where the output of cell 26 is passed directly to controls 34S and 41F' or to counter 67. To scan any predetermined lateral band area of the document or line of characters, switch 68 is thrown to its other condition connecting circuits 26' and 68' and switch 69 is closed. The counter 67 is then preset to generate a control signal on its output 67' upon receipt of any predetermined number of pulses from marker scanner 26. If device 67 is a counter and is preset to generate a control pulse on its output upon receipt of each pulse on its input (i.e. set for one count), then each line of the document will be read in a stepping fashion. If marks M are printed in alignment with each row of characters and terminate with the last of characters, then after reading the last row, the document will be driven out of the reader upon energization of limit switch 31 since no further signal will be generated on line 67' to stop motor 34 after 26 has scanned the last line indicating mark.

By replacing or bypassing counter 67 with a programming device such as a multicircuit timer or a programmable counter, it will be possible to scan any selected number of character rows on a document. Such a programmable counter may comprise a stepping motor coupled to a shaft having a plurality of cams or pins set at different angles to each other. The shaft is step-rotated equal angles each time a pulse is generated by line mark scanner 26. The preset cams are operative to close and open respective switches all connected to generate pulses on line 67' when different lines of characters are aligned with scanner 56.

To read the last line of a plurality of lines, the number of which may vary from document to document, scanner 26 may be positioned to scan mark locations one or more lines ahead of scanner 56. Upon detecting a condition where no mark is present (i.e. where the lines of characters terminate) the scanner control 26c may be operative to generate a signal on its output 26' which when connected to circuit 26" effects scanning said last line of characters.

It is thus seen that by adjusting and actuating the various switch and control means of FIG. 5a, various modes of scanning operations, as described, are possible to account for varying scanning functions according to the requirements for reading. If the documents are designed whereby the character line locating marks M may be provided at different distances from the left border or edge of the documents, such as in different columns provided adjacent said border, and the position of the scanning axis of the mark scanning cell 26 may be laterally adjusted along mount or arm 25 so as to locate said cell to scan the particular column or longitudinal strip area of each document, then a further mode of control is derived in which one or more random lines of characters of each document may be automatically scanned as determined by those character line marks appearing in the column being scanned. In other words, if documents are used which do not necessarily contain the same number of lines of characters and without any particular requirement for scanning all documents, then any selected line or lines of each document may be automatically read as described by providing marks adjacent those lines to be read and in the particular lateral band area or column being scanned by cell 26 which controls positioning of the character scanner. For such a scanning function, switch 68 would be thrown to connect circuits 26' and 26''. Such a mark or marks may be provided when one or more character line entries are made by typing or by means of manual means such as a pencil or pen. As an example, for a document requiring one or more monthly entries which must be read, twelve such scanner-mark columns may be provided and the machine will operate to read any number of entries made during the month by providing marks M adjacent said entries all in the proper column to be scanned by 26, which cell is laterally positioned and set by manual means at such a calibrated location along the arm 27 of mount 23 so as to scan the selected column of marks M which indicate those lines of characters to be read. Marks appearing in all other columns, such as provided during previous entries, will therefore not affect reading functions associated with the last entry or entries.

It is noted that the scanning components of the apparatus of FIGS. 1—5 may be subject to degrees of variation. For example, scanning of the selected line of characters may be effected by disc aperture means dividing each character into segments which are analyzed and automatically recognized by computational means as shown in U.S. Pat. Nos. 2,663,758, 2,897,481 and 2,978,590.

Also, the servomotor 33 utilized for driving the document may be controlled by an input means interlocked to the operation of limit switch 31 to step the document one line distance at a time for scanning selected lines.

In another form of the invention, the described rotating reading disc arrangement may be replaced by a bank of photoelectric cells such as photomultiplier devices or tubes operative to photo-optically scan different levels of the line of characters being read as the mount and housing 40 therefore is driven as described across the document. The outputs of said photoelectric cells may be fed to a computer for analysis and determination of characters being read in code form by means of matrix matching, stroke analysis or other means. Analogue waveform matching may also be employed for recognition of characters by employing a single photoelectric cell receiving light from a slit extending lateral to the direction of the line of characters and conveyed along the selected character line by means such as a housing 40, drive and guide means as described which is controlled as described.

I claim:

1. Apparatus for reading documents having a plurality of parallel lines of recorded information disposed adjacent each other along substantially predetermined band areas of said documents, said apparatus comprising:
  a. a base including a surface for prepositioning documents individually on said base;
  b. means for guiding individual documents in a first direction across said surface substantially normal to the parallel lines of information of said documents;
  c. receiving means for receiving individual documents and guiding said documents to said first direction guiding means;
  d. first drive means including a motor for power driving each document received by said receiving means in said first direction across said surface of said base;
  e. scanning means supported by said base for reading individual lines of a document and transducing the information read into electrical signals;
  f. means for guiding said scanning means in a second path substantially normal to said first direction to permit said scanning means to scan individual lines of information on a document;
  g. first control means for controlling operation of said first drive means to preposition and stop a document so that said document is predeterminately located on said surface;
  h. adjustable control means for varying the operation of said first control means whereby a document may be variably located stopped on said surface so as to selectively position any line of recorded information in alignment with said second path of travel of said scanning means;
  i. second drive means for driving said scanning means along said second path;
  j. second control means for controlling operation of said second drive means;
  k. means for operating said second control means when a document is predeterminately located and stopped on said surface to cause operation of said second drive means to urge movement of said means MEANS across a document and to cause it to scan a selected line of said document; and
  l. means operative after completion of scanning a line of a document by said scanning means to cause said first drive means to effect movement of said document off said base.

2. Apparatus in accordance with claim 1, said adjustable control means including means for sensing a selected portion of a document as it moves across said surface and for generating a control signal upon sensing said selected document portion, said sensing means being operatively connected to said means for controlling said first drive means and operative to effect stoppage of said first drive means to predeterminately locate a document on said surface with a selected line thereof aligned with said scanning means, said sensing means being also operatively connected to said control means for said second drive means for initiating operation thereof upon sensing said selected portion of a document.

3. Apparatus in accordance with claim 1 including further control means interlocked to the operation of said reading means for operating said power means to drive a document from said base after a line of information is read.

4. Apparatus in accordance with claim 1 whereby said sensing means comprises scanning means adjustably positionable along said base and operative to detect a locating mark on each document as it moves across said surface, said scanning means being operatively connected to said control means for stopping said first drive means when a document has reached a selected position on said surface whereby said document is stopped with a selected line of information recorded on said document being aligned with said scanning means and means operative upon the selective positioning of a document on said surface for causing said reading means to initiate scanning said selected line of information.

5. Apparatus in accordance with claim 1 whereby said sensing means comprises scanning means adjustably positionable along said base and operative to detect a predetermined portion of each document as it moves across said surface, said scanning means being operatively connected to said control means for stopping said first drive means when a document has reached a selected position on said surface whereby said document is stopped with a selected line of information recorded on said document being aligned with said reading means and means operative upon the selective positioning of a document on said surface for causing said reading means to initiate scanning said selected line of information.

6. Apparatus in accordance with claim 1 whereby said sensing means comprises a photoelectric cell and control for generating a pulse upon detecting a document, and means for feeding said pulse to said control for said first drive means to effect stoppage of a document in a predetermined location on said base.

7. Apparatus in accordance with claim 1 wherein said third control means includes a predeterminately located detection means for detecting a predetermined portion of a document, said detection means being operative to generate a control pulse upon detecting a document, a carriage, reading means being supported by said carriage, guide means for said carriage supported by said base, reversible drive means for said carriage operative to move said carriage along said guide means selectively in both directions during the act of reading information, said control means for said power means comprising first control means for initiating operation of said carriage drive means, second control means for reversing the direction of said drive means when said carriage has finished scanning a band area and has reached the end of its travel along said guide means and third control means for said drive means operative to stop said carriage at a home position, said first control means being operatively connected to said detection means whereby scanning is initiated when a document is predeterminately located on said base, said second control means comprising limit switch means operative to generate a pulse when said carriage reaches the end of its travel along said guide means, said third control means comprising limit switch means operative to stop said carriage when it has returned to home position.

8. Document reading apparatus in accordance with claim 1, whereby said sensing means comprises a photoelectric detector operative to generate a control signal upon detecting the leading edge of a document, means for applying said control signal to stop said first drive means with a selected line of the document aligned with said scanning means and starting said second drive means to cause said scanning means to scan said selected line of said document.

9. Apparatus in accordance with claim 2, said sensing means being operative to sense the presence of individual lines of characters of a document, said apparatus including means connected to said sensing means for generating a control signal when said sensing means fails to sense a line of characters of a document, and means for applying said control signals to effect the stoppage of said first drive means to stop said document with the last line thereof aligned with said scanning means and to initiate operation of said second drive means whereby said scanning means scans said last line of said document.

10. Apparatus in accordance with claim 1, said sensing means being operative to scan the leading edge of a document, means for adjustably locating said sensing means longitudinally on said base whereby the control signals generated by said sensing means may be operative to stop said document at different locations along said surface with different lines of the document aligned with said scanning means.